D. C. Ripley.
Making Glass.

Nº 75577. Patented Mar. 17, 1868.

Witnesses.
R. J. Campbell
Edw. Shafer

Inventor;
D. C. Ripley
by
Mason, Fenwick & Lawrence

United States Patent Office.

DANIEL C. RIPLEY, OF PITTSBURG, PENNSYLVANIA.

Letters Patent No. 75,577, dated March 17, 1868.

IMPROVEMENT IN THE MANUFACTURE OF GLASS.

The Schedule referred to in these Letters Patent and making part of the same.

TO ALL WHOM IT MAY CONCERN:

Be it known that I, DANIEL C. RIPLEY, of Pittsburg, in the county of Allegheny, and State of Pennsylvania, have invented a new and useful Improvement in the Manufacture of Glassware; and I do hereby declare that the following is a full, clear, and exact description thereof, reference being had to the accompanying drawings, making part of this specification, in which—

Similar letters of reference indicate corresponding parts in the three figures.

This invention relates to a new and useful improvement in the manufacture of sirup and cream-jugs or pitchers, whereby such articles can be produced at a much less cost of time, labor, and material, than those which are made under the old mode; at the same time they can be made to present a very neat and beautiful appearance.

The usual mode of making a sirup or cream-jug is to blow the lower portion or body of the jug in a mould, and while the glass is hot to stick on the handle, after which the article is taken to the annealing-oven and allowed to cool. The jug is then provided with a metallic top, which requires to be shaped and fitted to it, and then permanently cemented in place upon it, which latter operation does not properly belong to the glass-manufacturer, and requires to be performed in a separate department by experienced metal-workers. Hence the high cost of the articles as at present furnished in the market.

The nature of my invention consists in producing the top, or the top and handle of a sirup or cream-jug or pitcher, of glass separate from the body of said jug or pitcher, by casting such top in a mould under pressure, and so shaping it as to adapt it for being permanently cemented upon the glass body, thus making a jug or pitcher which is composed entirely of glass, with a pressed top and a blown body, as will be hereinafter explained.

To enable others skilled in the art to understand my invention, I will describe its construction and operation.

Figure 1:
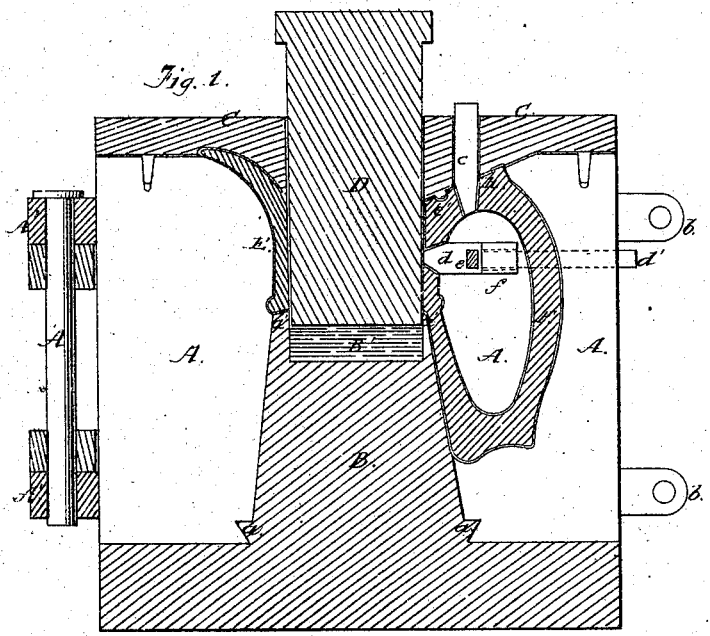
Figure 1 is a vertical central section through a mould which is adapted for moulding glass tops for molasses and cream-jugs.

In the accompanying drawings, fig. 1, I have represented a sectional view of one form of mould, which is adapted for use in producing my improved tops for jugs or pitchers. I do not, however, confine my invention to this, or any other particular form of mould, as the article in question may be produced in moulds differing somewhat in construction from that shown. This mould consists of five principal parts, which, when they are put together, form an internal space, corresponding in shape and size to the article which is produced therein. The body of the mould consists of two vertical halves or sections, A, which may be hinged together, as shown at $A^1$ $A^2$, and provided with ears, $b$, to receive fastenings for confining these halves together during the operations of pressing and casting. These halves are provided with a horizontal top-plate, C, and also with a bottom piece, B, which latter is constructed with a conical elevation, having a chamber, B′, in its upper end, and an annular ridge, $a$, near its lower end. The ridge $a$ is received by a groove, which is formed in the mould-sections A, when these parts are confined together, so that the base portion of the mould will be held in its place. The cavity in the upper end of the tapering portion of the base-plate B, is designed for receiving any surplus glass which will not be received in the mould proper; and the bevelled upper edge $a'$ of this tapering portion of base-plate B is designed to produce a shoulder abutment upon the lower edge of the jug or pitcher-top, as will be hereinafter described.

The central movable circular section D is adapted to work through the central hole through the cap C, and its lower end is of such diameter as will allow it to enter the chamber B′ in the tapering base portion B, when fully depressed, as shown in fig. 1. All that portion of the section D which enters the mould-chamber below the cap-section C, is made slightly tapering, for the purpose of producing an upwardly-tapering hole through the centre of the top of the jug or pitcher. The movable pins $c$ and $d$ show how holes can be left in the top E, or through this top, at suitable points, for receiving fastenings, which secure a hinged cover upon said top. The bead $e$ and the projection $h$, on the bottom face of the cap-section C, will produce corresponding recesses in the handle portion F of the top E, for receiving parts which form the fixed section of the cover of the top E.

By filling up the mould-chambers in the mould-sections A, which produce the handle F, a top, E, without a handle, made be produced.

The section D constitutes the plunger of a press, which press I have not shown, as it may be made in any well-known manner. This section being lifted out of its mould, a proper quantity of melted glass is put therein, when the section is forcibly brought down, and the glass caused to run into and fill the entire mould-space. As there will always be more or less superfluous glass put into the mould, I make a chamber, B', to receive it, as above described.

Figure 2:
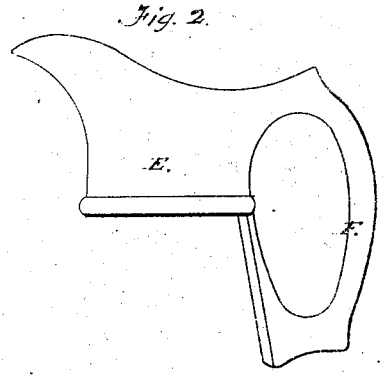
Figure 2 is a side view of a glass top, with handle formed upon it.
Figure 3:
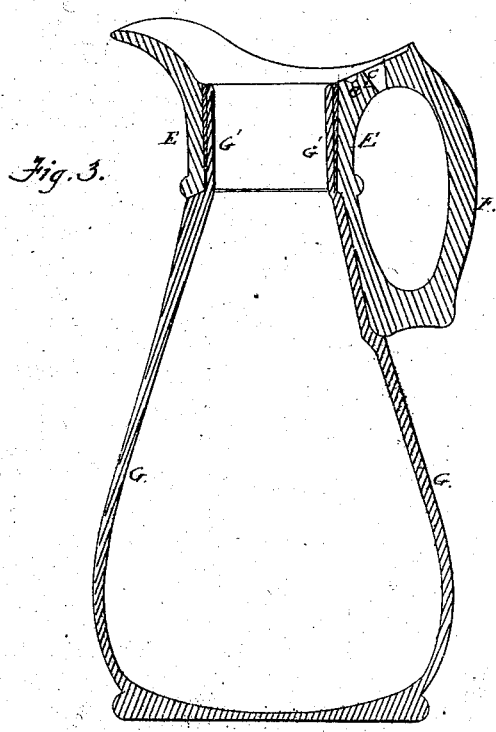
Figure 3 is a vertical central section of a jug, having a pressed-glass top, and a blown-glass body.

The article which I thus produce is represented in figs. 1, 2, and 3, by the letters E F. It is the top of a sirup or cream-jug, made of glass, compressed into a mould, as above shown, with a slightly-flaring passage through it, and a well-formed handle. This top is designed for receiving the tapering circular neck of a blown-glass base, G, as shown in fig. 3, and these two parts forming the jug or pitcher, are secured together by introducing cement into the annular tapering space between the neck G' and the internal surface of the top, as clearly shown in fig. 3.

If the tops are made of glass or porcelain, of a different color from that of the lower sections, the contrast will present a very beautiful appearance. If the tops are made without handles, the latter may be stuck on in any well-known manner.

Having described my invention, I claim as a new and improved article of manufacture—

A glass or porcelain pressed top, for sirup or cream-jugs or pitchers, substantially as described.

Witness my hand in matter of my application for a patent for improvement in manufacture of glassware:

DANIEL C. RIPLEY.

Witnesses:
   J. W. McGEARY,
   A. B. STEVENSON.